(12) United States Patent
Howell

(10) Patent No.: US 11,761,315 B2
(45) Date of Patent: *Sep. 19, 2023

(54) NON-FRACTURING RESTIMULATION OF UNCONVENTIONAL HYDROCARBON CONTAINING FORMATIONS TO ENHANCE PRODUCTION

(71) Applicant: Borehole Seismic, LLC., Houston, TX (US)

(72) Inventor: Bo Howell, Houston, TX (US)

(73) Assignee: Borehole Seismic, LLC., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/983,878

(22) Filed: Aug. 3, 2020

(65) Prior Publication Data

US 2021/0017842 A1    Jan. 21, 2021

Related U.S. Application Data

(63) Continuation of application No. 15/962,973, filed on Apr. 25, 2018, now Pat. No. 10,731,448.

(60) Provisional application No. 62/489,932, filed on Apr. 25, 2017.

(51) Int. Cl.
| | |
|---|---|
| *E21B 43/18* | (2006.01) |
| *C09K 8/04* | (2006.01) |
| *E21B 44/06* | (2006.01) |
| *E21B 43/25* | (2006.01) |
| *E21B 43/16* | (2006.01) |

(52) U.S. Cl.
CPC ............... *E21B 43/18* (2013.01); *C09K 8/04* (2013.01); *E21B 43/16* (2013.01); *E21B 43/25* (2013.01); *E21B 44/06* (2013.01)

(58) Field of Classification Search
CPC .......... E21B 43/16; E21B 43/26; E21B 43/18; E21B 43/25; E21B 44/06
See application file for complete search history.

(56) References Cited

U.S. PATENT DOCUMENTS

| | | | | |
|---|---|---|---|---|
| 4,887,671 | A * | 12/1989 | Stevens, Jr. | C09K 8/62 |
| | | | | 166/308.2 |
| 10,731,448 | B2 * | 8/2020 | Howell | C09K 8/04 |
| 2007/0277977 | A1 * | 12/2007 | Mesher | E21B 43/26 |
| | | | | 166/267 |
| 2015/0007988 | A1 * | 1/2015 | Ayasse | E21B 17/046 |
| | | | | 166/271 |
| 2017/0321110 | A1 * | 11/2017 | Hofstatter | E21B 43/20 |

* cited by examiner

*Primary Examiner* — Brad Harcourt
(74) *Attorney, Agent, or Firm* — Glen P. Belvis; Belvis Law, LLC.

(57) ABSTRACT

There is provided system and methods for restimulating a hydrocarbon producing well using water and pressures below the closure pressure, which results in production rates approaching the initial production rate of the well. There is provided multiple restimulation techniques using water based fluids at or below the closure pressure of the well, which results in production rates approach that of the prior rate upon stimulation.

6 Claims, 3 Drawing Sheets

Heterogeneous Structure

Lattice Structure

Schematic Anisotrophy

Relevant Property

NON-FRACTURING RESTIMULATION OF UNCONVENTIONAL HYDROCARBON CONTAINING FORMATIONS TO ENHANCE PRODUCTION

This application is a continuation of U.S. patent application Ser. No. 15/962,973, filed Apr. 25, 2018, which claims under 35 U.S.C. § 119(e)(1) the benefit of the filing date of U.S. provisional application Ser. No. 62/489,932 filed Apr. 25, 2017, the entire disclosure of each of which is incorporated herein by reference.

BACKGROUND OF THE INVENTION

Field of the Invention

The present inventions relate to the enhanced recovery of natural resources from within the earth; including systems, apparatus and methods to increase the production of natural resources from existing producing locations, minimizing the level of decline in production from existing production locations, and preferably increasing the level of production from existing production locations. In particular, an embodiment of the present inventions, relates to the enhanced recovery of hydrocarbons, e.g., crude oil and natural gas, from existing wells from unconventional shale formations within the earth.

In the production of natural resources from formations within the earth a well or borehole is drilled into the earth to the location where the natural resource is believed to be located. These natural resources may be a hydrocarbon reservoir, containing natural gas, crude oil and combinations of these; the natural resource may be fresh water; it may be a heat source for geothermal energy; or it may be some other natural resource that is located within the ground.

These resource-containing formations may be a few hundred feet, a few thousand feet, or tens of thousands of feet below the surface of the earth, including under the floor of a body of water, e.g., below the sea floor. In addition to being at various depths within the earth, these formations may cover areas of differing sizes, shapes and volumes.

Unfortunately, and generally, when a well is drilled into these formations the natural resources rarely flow into the well at rates, durations and amounts that are economically viable. This problem occurs for several reasons, some of which are well understood, others of which are not as well understood, and some of which may not yet be known. These problems can relate to the viscosity of the natural resource, the porosity of the formation, the geology of the formation, the formation pressures, and the perforations that place the production tubing in the well in fluid communication with the formation, to name a few.

Typically, and by way of general illustration, in drilling a well an initial borehole is made into the earth, e.g., the surface of land or seabed, and then subsequent and smaller diameter boreholes are drilled to extend the overall depth of the borehole. In this manner as the overall borehole gets deeper its diameter becomes smaller; resulting in what can be envisioned as a telescoping assembly of holes with the largest diameter hole being at the top of the borehole closest to the surface of the earth.

Thus, by way of example, the starting phases of a subsea drill process may be explained in general as follows. Once the drilling rig is positioned on the surface of the water over the area where drilling is to take place, an initial borehole is made by drilling a 36" hole in the earth to a depth of about 200-300 ft. below the seafloor. A 30" casing is inserted into this initial borehole. This 30" casing may also be called a conductor. The 30" conductor may or may not be cemented into place. During this drilling operation a riser is generally not used and the cuttings from the borehole, e.g., the earth and other material removed from the borehole by the drilling activity are returned to the seafloor. Next, a 26" diameter borehole is drilled within the 30" casing, extending the depth of the borehole to about 1,000-1,500 ft. This drilling operation may also be conducted without using a riser. A 20" casing is then inserted into the 30" conductor and 26" borehole. This 20" casing is cemented into place. The 20" casing has a wellhead secured to it. (In other operations an additional smaller diameter borehole may be drilled, and a smaller diameter casing inserted into that borehole with the wellhead being secured to that smaller diameter casing.) A BOP (blow out preventer) is then secured to a riser and lowered by the riser to the sea floor; where the BOP is secured to the wellhead. From this point forward all drilling activity in the borehole takes place through the riser and the BOP.

It should be noted that riserless subsea drilling operations are also contemplated.

For a land based drill process, the steps are similar, although the large diameter tubulars, 30"-20" are typically not used. Thus, and generally, there is a surface casing that is typically about 13⅜" diameter. This may extend from the surface, e.g., wellhead and BOP, to depths of tens of feet to hundreds of feet. One of the purposes of the surface casing is to meet environmental concerns in protecting ground water. The surface casing should have sufficiently large diameter to allow the drill string, product equipment such as ESPs and circulation mud to pass through. Below the casing one or more different diameter intermediate casings may be used. (It is understood that sections of a borehole may not be cased, which sections are referred to as open hole.) These can have diameters in the range of about 9" to about 7", although larger and smaller sizes may be used, and can extend to depths of thousands and tens of thousands of feet. Inside of the casing and extending from a pay zone, or production zone of the borehole up to and through the wellhead on the surface is the production tubing. There may be a single production tubing or multiple production tubings in a single borehole, with each of the production tubing endings being at different depths.

Typically, when completing a well, it is necessary to perform a perforation operation, and perform a hydraulic fracturing, or fracing operation. In general, when a well has been drilled and casing, e.g., a metal pipe, is run to the prescribed depth, the casing is typically cemented in place by pumping cement down and into the annular space between the casing and the earth. (It is understood that many different down hole casing, open hole, and completion approaches may be used.) The casing, among other things, prevents the hole from collapsing and fluids from flowing between permeable zones in the annulus. Thus, this casing forms a structural support for the well and a barrier to the earth.

While important for the structural integrity of the well, the casing and cement present a problem when they are in the production zone. Thus, in addition to holding back the earth, they also prevent the hydrocarbons from flowing into the well and from being recovered. Additionally, the formation itself may have been damaged by the drilling process, e.g., by the pressure from the drilling mud, and this damaged area of the formation may form an additional barrier to the flow of hydrocarbons into the well. Similarly, in most situations where casing is not needed in the production area, e.g., open hole, the formation itself is generally tight, and more typically can be very tight, and thus, will not permit the hydrocarbons to flow into the well. In some situations, the formation pressure is large enough that the hydrocarbons readily flow into the well in an uncased, or open hole. Nevertheless, as formation pressure lessens a point will be reached where the formation itself shuts-off, or significantly reduces, the flow of hydrocarbons into the well. Also, such low formation pressure could have insufficient force to flow fluid from the bottom of the borehole to the surface, requiring the use of artificial lift.

To address, in part, this problem of the flow of hydrocarbons (as well as other resources, e.g., geothermal) into the well being blocked by the casing, cement and the formation itself, openings, e.g., perforations, are made in the well in the area of the pay zone. Generally, a perforation is a small, about ¼" to about 1" or 2" in diameter hole that extends through the casing, cement and damaged formation and goes into the formation. This hole creates a passage for the hydrocarbons to flow from the formation into the well. In a typical well, a large number of these holes are made through the casing and into the formation in the pay zone.

Generally, in a perforating operation a perforating tool or gun is lowered into the borehole to the location where the production zone or pay zone is located. The perforating gun is a long, typically round tool, that has a small enough diameter to fit into the casing or tubular and reach the area within the borehole where the production zone is believed to be. Once positioned in the production zone a series of explosive charges, e.g., shaped charges, are ignited. The hot gases and molten metal from the explosion cut a hole, i.e., the perf or perforation, through the casing and into the formation. These explosive-made perforations extend a few inches, e.g., 6" to 18", into the formation.

The ability of, or ease with which, the natural resource can flow out of the formation and into the well or production tubing (into and out of, for example, in the case of engineered geothermal wells, and some advanced recovery methods for hydrocarbon wells) can generally be understood as the fluid communication between the well and the formation. As this fluid communication is increased several enhancements or benefits may be obtained: the volume or rate of flow (e.g., gallons per minute) can increase; the distance within the formation out from the well where the natural resources will flow into the well can be increase (e.g., the volume and area of the formation that can be drained by a single well is increased, and it will thus take less total wells to recover the resources from an entire field); the time period when the well is producing resources can be lengthened; the flow rate can be maintained at a higher rate for a longer period of time; and combinations of these and other efficiencies and benefits.

Fluid communication between the formation and the well can be greatly increased by the use of hydraulic fracturing techniques. The first uses of hydraulic fracturing date back to the late 1940s and early 1950s. In general, hydraulic fracturing treatments involve forcing fluids down the well and into the formation, where the fluids enter the formation and crack, e.g., force the layers of rock to break apart or fracture. These fractures create channels or flow paths that may have cross sections of a few micron's, to a few millimeters, to several millimeters in size, and potentially larger. The fractures may also extend out from the well in all directions for a few feet, several feet and tens of feet or further. It should be remembered that the longitudinal axis of the well in the reservoir may not be vertical: it may be on an angle (either slopping up or down) or it may be horizontal. For example, in the recovery of shale gas and oil the wells are typically essentially horizontal in the reservoir. The section of the well located within the reservoir, i.e., the section of the formation containing the natural resources, can be called the pay zone.

Typical fluid volumes in the initial propped fracturing treatment of a formation in general can range from a few thousand to a few million gallons. This initial hydraulic fracturing operation can have several phases, each having different volumes of fluids, pressures and amounts of proppant. These initial propped fracturing treatments take place during the competition phase of the well, before or as it goes "on line" to become a producing well. Although in other types of completions the wells may only be hydraulically fractured and no proppant is used. In general, the objective of hydraulic fracturing is to create and enhance fluid communication between the wellbore and the hydrocarbons in the formation, e.g., the reservoir.

The fluids used to perform the initial hydraulic fracture, i.e., during the completion phase, can range from very simple, e.g., water, to very complex. Additionally, these fluids, e.g., fracing fluids or fracturing fluids, typically carry with them proppants; but not in all cases, e.g., when acids are used to fracture carbonate formations. Proppants are small particles, e.g., grains of sand, aluminum shot, sintered bauxite, ceramic beads, resin coated sand or ceramics, that are flowed into the fractures and hold, e.g., "prop" or hold open the fractures when the pressure of the fracturing fluid is reduced and the fluid is removed to allow the resource, e.g., hydrocarbons, to flow into the well.

In this manner the proppants hold open the fractures, keeping the channels open so that the hydrocarbons can more readily flow into the well. Additionally, the fractures greatly increase the surface area from which the hydrocarbons can flow into the well. Proppants may not be needed, or generally may not be used when acids are used to create a frac and subsequent channel in a carbonate rich reservoir, where the acids dissolve part or all of the rock leaving an opening for the formation fluids to flow to the wellbore.

Typically fracturing fluids consist primarily of water but also have other materials in them. The number of other materials, e.g., chemical additives used in a typical initial fracture treatment during completion varies depending on the conditions of the specific wellbeing fractured. Generally, a typical fracture treatment will use from about 2 to about 25 additives.

For both convention and unconventional (e.g., tight or shale formations) after the hydraulic fracturing and other completion operations the well then starts to produce hydrocarbons. This first, i.e., initial production, from the well can be greatly increased by hydraulic fracturing and other completion techniques. Unfortunately, however, for all wells, in all types of formations, this initial production begins to decline, in what is referred to as a decline curve. This drop in initial production can start about 1 month, about 3 months, about 6 months or about 1 year into the life of the well. The decline curve can be gradual, or it can be step. In situations where the decline curve is step, the product can drop below levels that are economically viable (depending on the current hydrocarbon prices). The total production from the well, i.e., total amount of oil produced by the well over time, can be greatly, and adversely effected by a step decline curve, and in particular a step decline curve that manifests itself early in the life of the well.

The problem of such drops in initial production, and reduced total production, from wells has been long standing. These problems have resulted in the abandonment of many wells, leveling hundreds of thousands of barrels of oil and cubic feet of natural gas unrecovered and essentially unrecoverable. In particular, in unconventional wells. the art has been looking for ways to forestall the onset of the decline curve, to slow the rate of decline curve, and to increase the rate of production and the total product from a well.

Generally, before the present inventions, the art has addressed the decline curve problem with greater complexity, both chemically and through well design, and through brute force. Restimulation hydraulic fracturing operations can pump millions of gallons of water into a well at pressures far above the closure pressure of the formation in attempts to further break the rock and free up the hydrocarbons. Secondary and tertiary operations are employed with the need for injection wells, sweep wells, steam, etc. These prior art approaches generally have one thing in common, they subject the well and the formation to more and greater forces and harsher conditions to free up the remaining hydrocarbons.

Related Art and Terminology

As used herein, unless specified otherwise, the terms "hydrocarbon exploration and production", "exploration and production activities", "E&P", and "E&P activities", and similar such terms are to be given their broadest possible meaning, and include surveying, geological analysis, well planning, reservoir planning, reservoir management, drilling a well, workover and completion activities, hydrocarbon production, flowing of hydrocarbons from a well, collection of hydrocarbons, secondary and tertiary recovery from a well, the management of flowing hydrocarbons from a well, and any other upstream activities.

As used herein, unless specified otherwise, the term "earth" should be given its broadest possible meaning, and includes, the ground, all natural materials, such as rocks, and artificial materials, such as concrete, that are or may be found in the ground.

As used herein, unless specified otherwise "offshore" and "offshore drilling activities" and similar such terms are used in their broadest sense and would include drilling activities on, or in, any body of water, whether fresh or salt water, whether manmade or naturally occurring, such as for example rivers, lakes, canals, inland seas, oceans, seas, such as the North Sea, bays and gulfs, such as the Gulf of Mexico. As used herein, unless specified otherwise the term "offshore drilling rig" is to be given its broadest possible meaning and would include fixed towers, tenders, platforms, barges, jack-ups, floating platforms, drill ships, dynamically positioned drill ships, semi-submersibles and dynamically positioned semi-submersibles. As used herein, unless specified otherwise the term "seafloor" is to be given its broadest possible meaning and would include any surface of the earth that lies under, or is at the bottom of, any body of water, whether fresh or salt water, whether manmade or naturally occurring.

As used herein, unless specified otherwise, the term "borehole" should be given it broadest possible meaning and includes any opening that is created in the earth that is substantially longer than it is wide, such as a well, a well bore, a well hole, a micro hole, a slimhole and other terms commonly used or known in the arts to define these types of narrow long passages. Wells would further include exploratory, production, abandoned, reentered, reworked, and injection wells. They would include both cased and uncased wells, and sections of those wells. Uncased wells, or section of wells, also are called open holes, or open hole sections. Boreholes may further have segments or sections that have different orientations, they may have straight sections and arcuate sections and combinations thereof. Thus, as used herein unless expressly provided otherwise, the "bottom" of a borehole, the "bottom surface" of the borehole and similar terms refer to the end of the borehole, i.e., that portion of the borehole furthest along the path of the borehole from the borehole's opening, the surface of the earth, or the borehole's beginning. The terms "side" and "wall" of a borehole should to be given their broadest possible meaning and include the longitudinal surfaces of the borehole, whether or not casing or a liner is present, as such, these terms would include the sides of an open borehole or the sides of the casing that has been positioned within a borehole. Boreholes may be made up of a single passage, multiple passages, connected passages, (e.g., branched configuration, fishboned configuration, or comb configuration), and combinations and variations thereof.

As used herein, unless specified otherwise, the term "advancing a borehole", "drilling a well", and similar such terms should be given their broadest possible meaning and include increasing the length of the borehole. Thus, by advancing a borehole, provided the orientation is not horizontal and is downward, e.g., less than 90°, the depth of the borehole may also be increased.

Boreholes are generally formed and advanced by using mechanical drilling equipment having a rotating drilling tool, e.g., a bit. For example, and in general, when creating a borehole in the earth, a drilling bit is extending to and into the earth and rotated to create a hole in the earth. To perform the drilling operation the bit must be forced against the material to be removed with a sufficient force to exceed the shear strength, compressive strength or combinations thereof, of that material. The material that is cut from the earth is generally known as cuttings, e.g., waste, which may be chips of rock, dust, rock fibers and other types of materials and structures that may be created by the bit's interactions with the earth. These cuttings are typically removed from the borehole by the use of fluids, which fluids can be liquids, foams or gases, or other materials know to the art.

The true vertical depth ("TVD") of a borehole is the distance from the top or surface of the borehole to the depth at which the bottom of the borehole is located, measured along a straight vertical line. The measured depth ("MD") of a borehole is the distance as measured along the actual path of the borehole from the top or surface to the bottom. As used herein unless specified otherwise the term depth of a borehole will refer to MD. In general, a point of reference may be used for the top of the borehole, such as the rotary table, drill floor, well head or initial opening or surface of the structure in which the borehole is placed.

As used herein, unless specified otherwise, the term "drill pipe" is to be given its broadest possible meaning and includes all forms of pipe used for drilling activities; and refers to a single section or piece of pipe. As used herein the terms "stand of drill pipe," "drill pipe stand," "stand of pipe," "stand" and similar type terms should be given their broadest possible meaning and include two, three or four sections of drill pipe that have been connected, e.g., joined together, typically by joints having threaded connections. As used herein the terms "drill string," "string," "string of drill pipe," string of pipe" and similar type terms should be given their broadest definition and would include a stand or stands joined together for the purpose of being employed in a borehole. Thus, a drill string could include many stands and many hundreds of sections of drill pipe.

As used herein, unless specified otherwise, the terms "workover," "completion" and "workover and completion" and similar such terms should be given their broadest possible meanings and would include activities that take place at or near the completion of drilling a well, activities that take place at or the near the commencement of production from the well, activities that take place on the well when the well is a producing or operating well, activities that take place to reopen or reenter an abandoned or plugged well or branch of a well, and would also include for example, perforating, cementing, acidizing, fracturing, pressure testing, the removal of well debris, removal of plugs, insertion or replacement of production tubing, forming windows in casing to drill or complete lateral or branch wellbores, cutting and milling operations in general, insertion of screens, stimulating, cleaning, testing, analyzing and other such activities.

As used herein, unless specified otherwise, the terms "formation," "reservoir," "pay zone," and similar terms, are to be given their broadest possible meanings and would include all locations, areas, and geological features within the earth that contain, may contain, or are believed to contain, hydrocarbons.

As used herein, unless specified otherwise, the terms "field," "oil field" and similar terms, are to be given their broadest possible meanings, and would include any area of land, sea floor, or water that is loosely or directly associated with a formation, and more particularly with a resource containing formation, thus, a field may have one or more exploratory and producing wells associated with it, a field may have one or more governmental body or private resource leases associated with it, and one or more field(s) may be directly associated with a resource containing formation.

As used herein, unless specified otherwise, the terms "conventional gas", "conventional oil", "conventional", "conventional production" and similar such terms are to be given their broadest possible meaning and include hydrocarbons, e.g., gas and oil, that are trapped in structures in the earth. Generally, in these conventional formations the hydrocarbons have migrated in permeable, or semi-permeable formations to a trap, or area where they are accumulated. Typically, in conventional formations a non-porous layer is above, or encompassing the area of accumulated hydrocarbons, in essence trapping the hydrocarbon accumulation. Conventional reservoirs have been historically the sources of the vast majority of hydrocarbons produced. As used herein, unless specified otherwise, the terms "unconventional gas", "unconventional oil", "unconventional", "unconventional production" and similar such terms are to be given their broadest possible meaning and includes hydrocarbons that are held in impermeable rock, and which have not migrated to traps or areas of accumulation.

As used herein, unless stated otherwise, room temperature is 25° C. And, standard temperature and pressure is 25° C. and 1 atmosphere. As used herein, unless stated otherwise, generally, the term "about" is meant to encompass a variance or range of ±10%, the experimental or instrument error associated with obtaining the stated value, and preferably the larger of these.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

There has been a long-standing, expanding and unmet need, for improved ways to obtain resources, and in particular, hydrocarbon resources from the earth. Thus, there exists a long felt, increasing and unfulfilled need for, among other things, systems and methods for extending the useful life of wells, reducing the rate of decline in a well, and increasing the total production obtained from a well. The present inventions, among other things, solve these needs by providing the articles of manufacture, devices and processes taught, and disclosed herein.

There is provided a method of reducing the decline curve in production rate for an existing well in a formation, the method including: identifying a producing well that has a production rate, wherein the production rate is at least 20% below an initial production rate for the well; and wherein the well has a closure pressure; pumping a restimulation fluid into the well at a predetermined flow rate and predetermined pressure, wherein the closure pressure of the well is not exceeded; whereby, the production rate of the well is increased by not less than 50%.

There is further provided these methods including on or more of the following features: wherein there is no perceivable fracturing of the formation; wherein there is no fracturing of the formation; wherein the production rate of the well is increased by not less than 100%; wherein the production rate of the well is increased by not less than 75%; wherein the restimulation fluid consists of water; wherein the restimulation fluid consists essentially of water; wherein the restimulation fluid comprises water; wherein the restimulation fluid is free from additives selected from the group consisting of solvents, biocides, and scale inhibitors; and, wherein the restimulation fluid is free from additives selected from the group consisting of thickening agents, surfactants, and scale inhibitors; wherein the restimulation fluid comprises used fracturing fluid.

Moreover, there is provided these methods including on or more of the following features: wherein the production rate of the well is increased by at least 100%; and wherein the production rate of the well is increased by at least 75%.

Yet additionally, there is provided a method of reducing the decline curve in production rate for an existing well in a formation, the method including: identifying a producing well that has a production rate, wherein the production rate is at least 20% below an initial production rate for the well; and wherein the well has a closure pressure; pumping a restimulation fluid into the well at a predetermined flow rate and predetermined pressure, wherein the closure pressure of the well is not exceeded; whereby, the production rate of the well is increased by not less than 50%.

Still further there is provided a method for increasing a production rate of the production of hydrocarbons from an existing well in a formation, the method including: pumping a restimulation fluid into the well at a predetermined flow rate and predetermined pressure, wherein a stasis is achieved that is at or below the closure pressure of the well; maintaining the well at the stasis; and, whereby, existing fractures are opened without the formation of new fractures.

Additionally, there is provided these methods having one or more of the following features: whereby the production rate of the well is increased by 5%; whereby the production rate of the well is increased by 10%; whereby the production rate of the well is increased by 15%; whereby the production rate of the well is increased by 20%; and whereby the production rate of the well is increased and the increase is not less than a 20% increase, not less than a 40% increase, not less than a 50%, not less than a 100% increase in product rate just prior to the restimulation.

Still further, there is provided these methods having one or more of the following features: wherein the stasis is at just below the closure pressure; wherein the stasis is at about 90% of the closure pressure; wherein the stasis is at about 85% of the closure pressure; wherein the stasis is maintained for 30 minutes; wherein the stasis is maintained for 2 hours; wherein the stasis is maintained from about 15 minutes to about 2 hours; wherein the stasis is maintained from about 15 minutes to about 1 hour; wherein the stasis is maintained from about 30 minutes to about 3 hours; and wherein the stasis is less than about 2 hour, and wherein the stasis is less than 3 hours.

In addition, there is provided a method of stimulating a well having existing fractures, wherein the existing fractures include induced fractures, naturally occurring fractures or both of these types of fractures, and a production rate of hydrocarbons, by repressurization, the method including: pumping a repressurization fluid into the well, thereby establishing and maintaining a stasis; wherein at the stasis existing fractures are opened and pore surface are wetted with the repressurization fluid; wherein at the stasis no new fractures and created; and, whereby, the production rate of the well is increased.

There is provided a method of increasing the total product of hydrocarbons from an existing well, by performing multiple restimulations of the well and thereby repeatedly reducing the decline curve in production rate for the, the method including: (a) performing a first restimulation comprising the steps of: identifying a producing well that has a production rate, wherein the production rate is at least 20% below an initial production rate for the well; and wherein the well has a closure pressure; pumping a restimulation fluid into the well at a predetermined flow rate and predetermined pressure, for a predetermined time to provide a status time, the status time comprising a time of about 30 minutes to about 3 hours, wherein during the status time the closure pressure of the well is not exceeded; and, thereby providing a restimulated well, wherein the production rate increased by not less than 20% to provide a first restimulated product rate; and (b) performing a second restimulation comprising the steps of: determining that a later production rate of the restimulated well, is at least 20% below the first restimulated production rate; and wherein the restimulated well has a later closure pressure, wherein the later closure pressure can be the same or different than the closure pressure; pumping a restimulation fluid into the well at a second predetermined flow rate and a second predetermined pressure, for a second predetermined time, wherein the second rate, time and pressures can be the same or different than the rate, time and pressures of step b. II., to provide a second status time, wherein the second status time comprising a time of about 30 minutes to about 3 hours, wherein during the second status time the later closure pressure of the well is not exceeded; whereby the later production rate of the well is increased by not less than 20% to provide a later restimulated product rate.

Moreover, there provided these methods having one or more of the following features: wherein the restimulation steps are repeated a plurality of times over the life of a well, wherein steps (a) and (b) are repeated at least once; and wherein step (b) is repeated a plurality of times.

DESCRIPTION OF THE PREFERRED EMBODIMENTS

Figure 1:
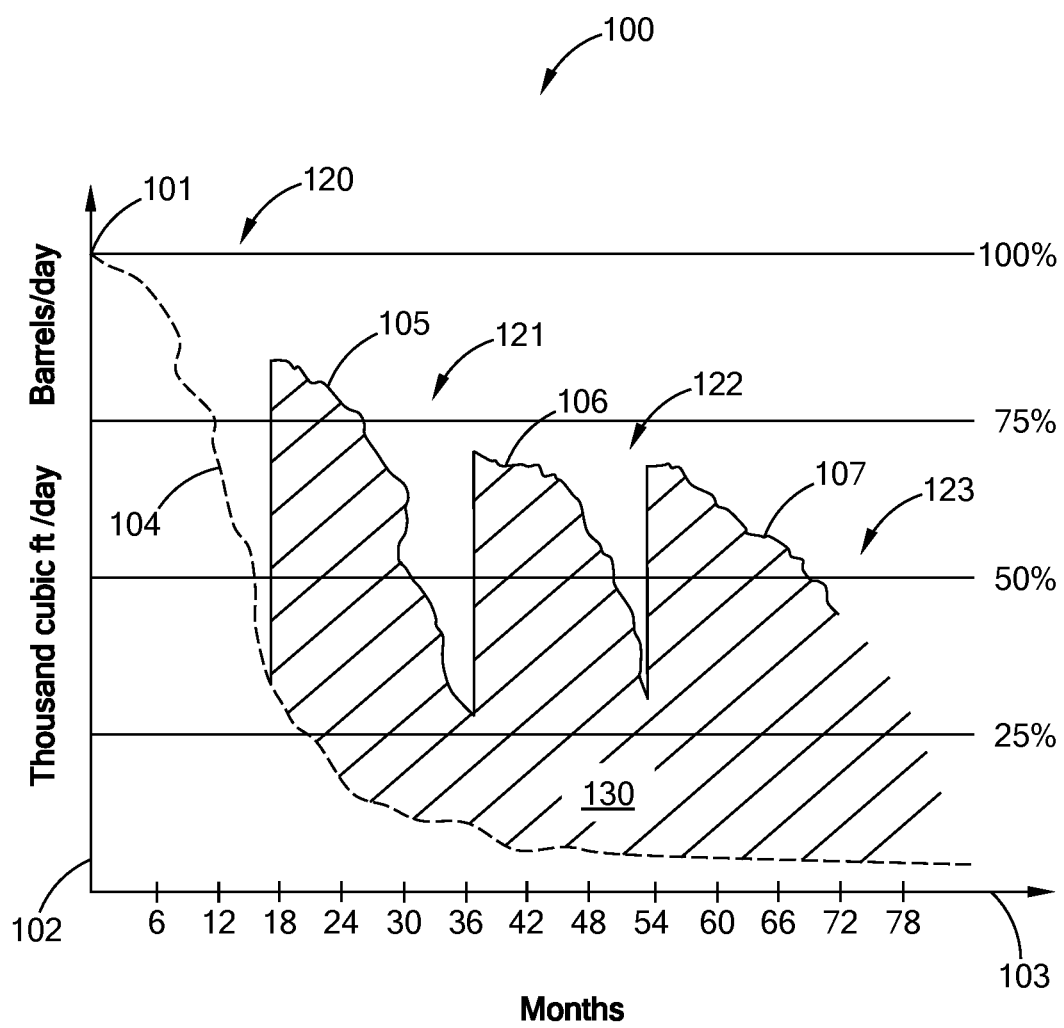
FIG. 1 is a chart showing increased rate of production for a well restimulated in accordance with an embodiment of the present inventions.

The present inventions generally relate to systems, methods and operations to enhance the recovery of natural resources from the earth, by the use of restimulation operations.

In general, in an embodiment of the present restimulation operation a fluid, preferably a liquid, is forced into a resource containing area or zone of the earth. The flow rate and pressure of the fluid is controlled in a predetermine manner to reopen, reconfigure, or separate prior fractures (both natural and man-made) while minimizing, and preferably, not causing any additional fracturing or damage to the rock.

Although the majority of this specification focusses on embodiments of restimulation operations for unconventional hydrocarbon (e.g., shale oil and natural gas) containing formations and reservoirs, it should be understood that this is only by way of a preferred embodiment. Embodiments of the present restimulation operations may find applications and provide benefits in conventional wells and formations, in other types of hydrocarbon containing formations, on land and subsea, and geothermal applications, as well as, in the extraction of ores, gems and minerals from the earth.

Generally, in an embodiment of the restimulation operation, an existing producing oil well in an unconventional shale formation is selected. Typically, during completion, the well was hydraulically fractured with at least about 10,000 gallons (gals) of fracturing fluid, primarily water, at least about 100,000 gals, at least about 1,000,000 gals of water, at least about 3,000,000 gals of water and more, larger and smaller amounts of fluid may also be used. The fracturing fluid typically contained from about 1 pound (lb) to about 15 lbs of proppant per gallon, and all amounts within this range, although larger and smaller amounts of proppant, and different amounts with different stages, may be used. The pressure of the fracturing fluid during hydraulic fracturing can be greater than 2,000 psi, greater than 5,000 psi, greater than 10,000 psi and greater than 12,000 psi, from about 2,000 psi to about 12,000 psie, and all pressures within these ranges. Typically, during the initial hydraulic fracturing, the pressure in the formation is increased to the point where the rock is broken and fractured, the pressure may than be reduced (or maintained at about this point) as additional fluid is pumped into the formation and the proppant is carried with it. The pressure will then be reduced and the formation will close in with the proppant keeping some of the fractures open, i.e., propping them open, to permit hydrocarbons to flow from the formation into the well and ultimately to the surface. This pressure, where the formation after being fractured closes back in, i.e., the "closure pressure," is a well know feature of a well, and typically is documented, known or at least inferentially understood for each producing well that has been hydraulically fractured. If it is not known, or the information was lost, it can readily be determined again.

After about 6 months of production (sooner in some instances and longer in others) the decline curve starts to appear for the well. The amount of oil or natural gas that was first produced ("initial production") after the initial hydraulic fracturing, or stimulation, begins to decrease rapidly.

Turning to FIG. 1 there is a chart 100 showing the production rate of an unconventional shale well over time. The y-axis 102 represents the hydrocarbon production rate for the well (in either thousands of cubic feet of natural gas per day, or barrels of oil per day), with the production rate increasing in the direction of the arrow on axis 102. The x-axis 103 represent time after the well goes on line in months. When the well first goes on line, i.e., starts producing hydrocarbons, this will be the time of the highest rate of production, which is the initial production 101. Over time the production rate of the well will decrease, e.g., a decline cure, which is shown by typical production curve 104. Depending on conditions, over 30%, over 40% and over 50%, from about 30% to about 50%, and all values within these ranges or along curve 104, of the initial production rate of an unconventional shale well can be lost in the first 6 to 18 months of production. Although steeper and shallower decline curves may also occur.

In an embodiment of the present invention, at a point in time along the decline curve the well is restimulated, preferably using a restimulation fluid that is preferably essentially only water, and preferably only water. By "essentially" only water, it is meant that there are no chemicals or other materials added to the water the purpose of functionality and that the water is at least 98% pure. Biocides and slimocides can be added to the water. Other chemicals and additives may be added to the water for other purposes. However, it has surprising been discovered that restimulation of a well with water, without the aid of chemical additives, can have the benefit of significantly reversing the decline in the production rate of a well. The restimulation is pumped back into the well under pressure and flow rates that preferably do not break the rock, and that are at or below the closure pressure of the formation. Most preferably just below the closure pressure, e.g., from about 65% to about 97% of the closure pressure, from about 90% to 98% of the closure pressure, about 95% of the closure pressure, about 90% of the closure pressure, about 80% of the closure pressure and about 70% of the closure pressure, and all values within these ranges.

Thus, turning to FIG. 1 a first restimulation operation 120 of the present invention was conducted, about 18 months into the life of the well. Water was forced into the well at just below the closure pressure of the well, when the pressure was reduced and the well returned to production. The production rate 105 of the well, after the first restimulation operation 120, increased to about 80% of its initial production. This first restimulation 120 production rate, however may see a decline cure 105, as shown in FIG. 1. At a point alone this decline curve 105 the well may have a second restimulation operation 121 conducted. This restimulation operation 121 again uses essentially only water and is kept at pressures just below the closure pressures. The second restimulation operation 121 greatly increases the production rate providing a new production curve or decline curve 106. This cycle of decline and restimulation can be repeated, as shown in the third restimulation 122 and production rate increase and decline curve 107, and can be further repeated over time 123.

Thus, it can be seen that by restimulation with just water as the restimulation fluid, at pressures just below the closure pressure the production rate of the well can be increased. It is contemplated that for some wells the production rate can be increased to about 100% of the initial production rate (as well as, initial rate after prior restimulation, when multiple restimulations are used), to at least about 95% of the initial production rate, to at least about 90% of the initial production rate, and to at least about 50% of the initial production rate, from about 45% to about 100% of the initial product rate, from about 50% to about 75% of the initial product rate, as well as all values within these ranges. In the case of earlier restimulations, these percentages of "initial" recovery would be the last prior production rate after a restimulation, e.g., rate after second restimulation, rate after third restimulation, etc. (see FIG. 1 showing a percentage of recovery of rate after prior restimulation).

Additionally, the total production from the well can be increased through the use of the present restimulation operations. Thus, as illustrated in FIG. 1 the area 130 between the restimulation production curves 105, 106, 107, etc., and the typical production curve 104, represents additional total production (additional total barrels of oil or total cubic feet of gas) that is recovered. Thus, for example, using the restimulation techniques of the present inventions it is contemplated that the total recovery of a well can be increased by at least about 5%, at least about 10%, at least about 30% and at least about 50% or more, from about 5% to about 20%, from about 5% to about 50%, from about 5% to about 10%, from about 7% to about 25%, and, as well as, all values within these ranges.

While percentage reductions were show in the chart of FIG. 1 for ease of comparison and illustration purposes. The production rates for shale oil field wells and the resultant increase in production rate, or reduction in the rate of decline, can result in the recovery of significant amounts of hydrocarbons.

Thus, reported values for initial production rates for a typical well in various shale fields is show in Table 1. The percentage improvements, decrease in decline rate, and increase in production rate, for embodiments of the present inventions, are applicable to the values of Table 1, as well as larger, smaller and other production rates in those general ranges.

TABLE 1

| Region | New-well oil production per rig barrels/day | | | New-well gas production per rig thousand cubic feet/day | | |
| --- | --- | --- | --- | --- | --- | --- |
| | August 2016 | September 2016 | change | August 2016 | September 2016 | change |
| Bakken | 857 | 875 | 18 | 1,149 | 1,189 | 40 |
| Eagle Ford | 1,076 | 1,089 | 13 | 3,194 | 3,232 | 38 |
| Haynesville | 31 | 31 | — | 5,573 | 5,639 | 66 |
| Marcellus | 69 | 69 | — | 11,353 | 11,503 | 150 |
| Niobrara | 961 | 982 | 21 | 3,004 | 3,080 | 76 |
| Permian | 520 | 522 | 2 | 895 | 895 | — |

TABLE 1-continued

| | New-well oil production per rig barrels/day | | | New-well gas production per rig thousand cubic feet/day | | |
|---|---|---|---|---|---|---|
| Region | August 2016 | September 2016 | change | August 2016 | September 2016 | change |
| Utica | 351 | 360 | 9 | 7,547 | 7,659 | 112 |
| Rig-weighted average | 560 | 578 | 18 | 2,859 | 2,767 | (92) |

Figure 2:
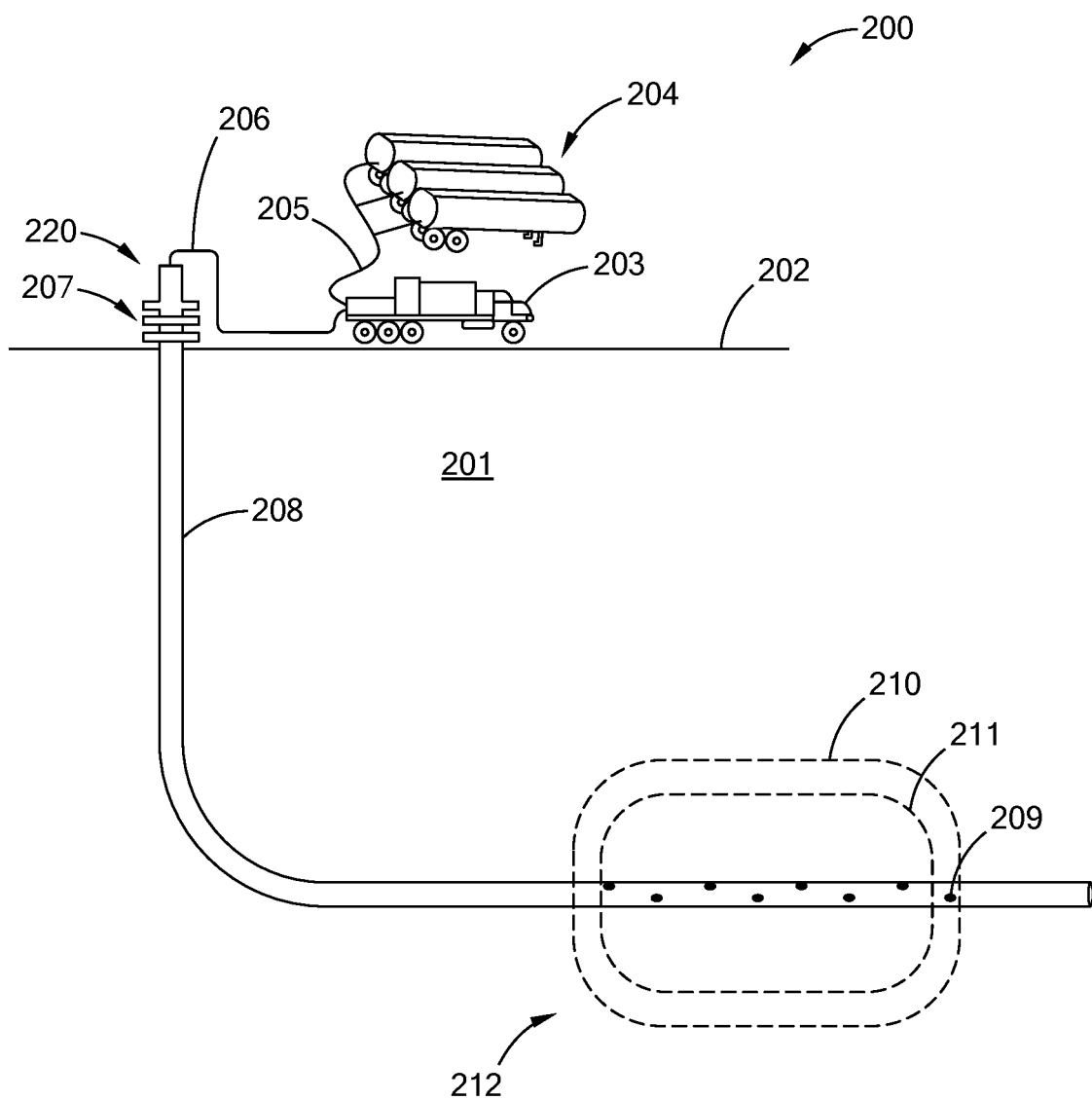
FIG. 2 is a cross section schematic of an embodiment of a restimulation site in accordance with the present inventions.
Figure 3A:
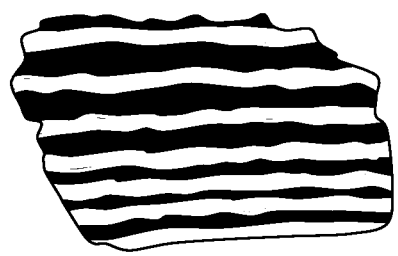
FIGS. 3A to D are cross sectional and schematic representations of formation properties, that relate to the embodiments of the present inventions.
Figure 3B:
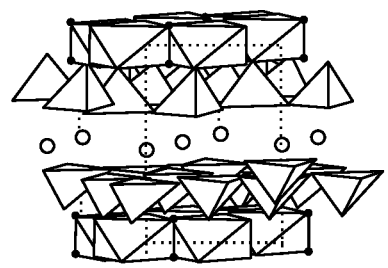
Figure 3C:
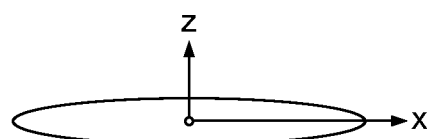
Figure 3D:
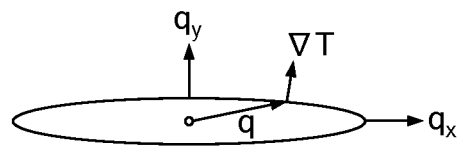

In FIG. 2, the is shown a cross sectional of a well in a formation and a restimulation system for preforming a restimulation operation. The restimulation site 200 has a producing well 220 that extends below the surface 202 of the earth 201 in a formation pay zone 212. During completion of the well 220 the bore hole 208 was perforated, e.g., 209, and stimulated by hydraulic fracturing with proppant. The area of fracture or rock breakage is shown by dashed line 210, and the propped area, the area where the proppant was retained and holds the fractures open is shown by dashed line 211. A pump truck 203 (more than one may be used or required) has low pressure water line 205 feeding into the pumps. The water line 205 is connected to a source of water 204 (in the preferred embodiment essentially water, and only water, or in other embodiments, other restimulation fluids can be used). The pump truck has high pressure water line 206 that is feed into a BOP on the well held 207.

Because lower pressures are used, e.g., pressures below the close off pressure, preferably packers and special tools are not required and are not used for the restimulation. In the embodiment, the water is pumped (e.g., by truck 203 through line 206 into the well bore 208) into the formation pay zone 212, (e.g., the propped zone 211, the breakage zone 210, and both) through the perforations, e.g., 209, at a pressure and flow rate sufficient to maintain the desired restimulation pressure, which is below the closure pressure of the pay zone 212.

Although not being bound or limited by the present theory, to advance this important art, and explain the surprising and significate benefits obtained by the present inventions, it is theorized that by using this lower pressure, and minimizing or avoiding additional damage to the formation, micro-fractures, closed or occluded fractures, and the like, may be reopened, that the fracture network may be reconfigured, or otherwise rearrangement, and all of these. In this manner, it is further theorized that additional surface area is provided, different surface area is provided, and both; and that this surface area provides for the production of additional hydrocarbons at increased rates of production.

Thus, further explaining the present theory, hydraulic fracturing creates or provides in the formation a hydrocarbon transmission system to open and network vast plated (planar) pore reserves of combined phase gaseous and long-chain hydrocarbon situated throughout the rock by paning (window pane) systems of porous and permeable material predominately between least-stress planes of geological interface. Near-wellbore, and more specifically the near-fracture stress regimes are changed dramatically as rock is dilated and material is injected from pressure pumping. The injected material proppant separating the plated geology expose pore reserves to order of magnitude changes in permeability, yielding a transmission system and communication network to the wellbore and then to surface. The more contact between pore-reserves and permeable-proppant, the better. This contact is believe to be increased by the present restimulation embodiments. Turing to FIG. 3, and (a) through (s), as the hydrocarbons are removed from the formation, along or via the various fracture paths, especially over prolonged periods, mechanical deformation in the rock occurs, resulting from substantial displacement of fluid and gas volumes from the rock. As hydrocarbon volumes are produced, thus displacing hydrocarbon volumes from the formation, structural support of the formation is simultaneously displaced, creating an environment of constant, creeping reorganization of material structure altering the geometry of the of the rock-proppant interface and the stress regime of the rock, thereby creating more fractures along secondary stress planes, etc., and thus unlocking more potential, but yet uncontacted, surface area containing pore-reserve bearing geology. "Natural" secondary fracture systems are created as a result of production volume displacement through the induced primary fracture system. The creep-induced increase in surface area of the rock at the proppant-geological bed boundary consequently depletes throughout the production cycle and also corresponds to reduced conductivity throughout the proppant layers as overburden cooperates with changing reservoir conditions to do damaging work on our transmission infrastructure, something analogous to buckling in pipe and restriction in nozzle, and our communication networks break down. It is theorized that the repressurization of the formation, through embodiments of the present restimulation techniques, provides for a rearrangement of sort, that enables the potential surface area from the natural fractures that were created over time to be utilized for production.

Figure 4:
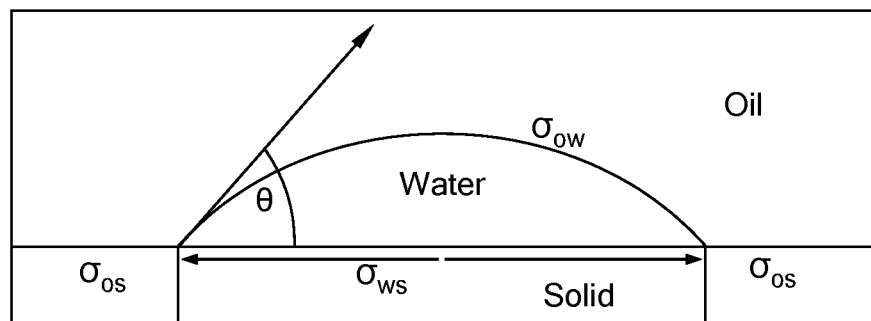
FIG. 4 is a schematic showing a type of contact angle measurement, that relates to embodiments in accordance with the present inventions.

Additionally, it is theorized that, as show in FIG. 4, that the water displaces hydrocarbon from the pore as the wettability preference of the rock change instantaneously. In this manner, the repressurization fluid can readily reach and reopen closed porosity and unused porosity without the need to have large pressures, as the capillaries are drawing the water into replace any hydrocarbon that may be present. Thus, these closed and unused porosity can be reopened at pressures at or below the fracture pressure.

Prior to the present inventions, it was generally known that a well could be repressurized to prevent fracturing fluid, from the fracturing of an adjacent well, from damaging the well, or being wasted by entering into areas of the formation that have already been fractured. Generally, however, the pressures used for these repressurizations, i.e., a prophylactic repressurization, were based upon the pressures of the fracturing fluid, the distance between the wells and other facts. These prophylactic repressurizations protected the well, they did not, and do not, restimulate it. Embodiments of the present inventions greatly are scientifically different from, and greatly improve upon these prior prophylactic repressurizations. The present inventions focus on providing a pressure that is at, or just below the fracture pressure, in this manner reopening existing fractures and expose greater surface are to those fractures for increased drainage and production. In this manner one, two, all nearby wells, or an entire field can be restimulated as new wells are fractured.

Embodiments of the present inventions restimulated wells, and provide increased rates of hydrocarbon production, without creating additional fractures in the formation of the pay zone, that is adjacent the well bore.

The following examples are provided to illustrate various embodiments of the present restimulation operations. These examples are for illustrative purposes, may be prophetic, and should not be viewed as, and do not otherwise limit the scope of the present inventions.

EXAMPLES

Example 1

Method for the protection and enhancement of stimulation of fragile fracture network systems in existing wells.

To dilate existing plumbing of an old well repressurization fluid is pumped into the old well at initial pumping rates between 1-5 bbl/min (barrel oil per minute, 1 bbl/min is equal to 158.99 L/min, 42 gals/min), recognizing that large and smaller initial pumping rates may be used or needed. During initial pumping the surface pressure is carefully monitored, an in particular carefully monitored as the surface pressure begins to approach the opening pressure of the old well. As the opening pressure of the old well is approached, the rates of the pumps will be lowered, lowered below their initial pump rates, and further to make certain so as not to exceed fracture pressure. Thus, in controlling the pumping rate and pressure, it is understood that the fluid product being pumped into the well, forms a solid column of fluid or solid column of gas. In an embodiment of this example, the fluid being pumped is water having a purity of at least 98% and having no functional chemicals or additives in it. In another embodiment of this example, the fluid being pumped is water with biocides, scale inhibitors added to it. In another embodiment, the fluid is used frac fluid that has been cleaned to remove particulates that could damage the well, equipment or both.

Example 2

Prior to the fracturing of a new well, in a field, having several existing wells, production in the existing wells that are directly adjacent to the new is ceased. Once production has stopped the existing adjacent wells are cleaned out to remove bridges or other restrictions in those wells that could affect flow rate and production. As the fracturing of the new well begins, and more preferably, prior to the first stage (e.g., the pad) of the fracturing job on the new well, the repressurizing fluid is pumped into the existing directly adjacent wells to increase the pressure in those wells.

Typically from about 500 to 2,500 bbl. (greater amounts can be used or needed, e.g., 5,000 bbl, 7,500 bbl and more) are pumped into each of the directly adjacent existing wells. The fluid is pumped into each well and surface pressure for each well is closely monitored to be maintained at, or just below, fracture pressure for each of the existing wells. Thus, a situation of stasis should be obtained for each of the existing wells. The pressures are then maintained throughout the fracturing of the new well, and maintained through all stages of the frac job of the new well. The pressures in the existing wells should then be maintained for a time after the frac job has been complete (e.g., after the last high pressure stage of the frac job). Thus, stasis in the existing wells, at, or just below, the fracture pressure for the existing wells should be maintained for about 15 minutes, about 30 minutes, about 1 hour, from about 10 minutes to about 2 hours, from about 30 minutes to about 2 hours, as well as all times within these ranges, and longer or shorter times.

It should be noted that the pressure at stasis for each of the existing wells may be different as each of the existing wells may have a different fracture pressure.

Example 3

The repressurization operation of Example 2 is performed on existing wells in the field that are nearby the new well, as well as, to the existing wells that are directly adjacent to the new well.

Example 4

In an existing field, there are several new well that define a general area of the field. The repressurization operation of Example 2 is performed on all existing wells in that area.

Example 5

The repressurization fluid is water based, preferably water, or more preferably essentially only water. It can also be other downhole fluids, including frac fluids, and waste fluids (provided that they are sufficiently free from particles and debris to not damage the well). For a preferred embodiment of the present inventions no proppant of any size is present in the repressurization fluid, or used in the restimulation operations. The repressurization fluids may also have additives, or contain and include chemicals, biologics, nano-particles, as well as, other downhole materials, presently know to the art or later developed. These additives would include, such materials as thickening agents, surfactants (which may be conventional and/or nano-type surfactants containing various solvents, any chemical (we need to be broad here), biocides, scale inhibitors, and any assortment of chemical products which may be advantageous to the fluid as known to those knowledgeable in the art of stimulation.

Example 6

Preferably, the injection process, i.e., the repressurization of the existing well, will be such that the pressure stays below parting (e.g., fracture) pressure and does not open new fracture systems. In some embodiments, for some wells, however, the ability to exceed parting pressure can be tolerated for very short periods of time without significant adverse consequences, provided the pump rate, and thus the pressures are dropped back down quickly, e.g., less than about 30 minutes, less than about 15 minutes, and less than about 10 minute, and from about 5 minutes to about 1 hour, and from about 10 minutes to about 40 minutes, from about 10 minutes to about 1.2 hours, as well as, all values within these ranges and longer and shorter time periods. In wells where the precise closure pressure is not known, diagnostics can be performed to establish fracture closure pressure. (Fracture pressure, fracture closure pressure, parting pressure, all refer to the same general property of the formation, which is that pressure at, or just below that, at which new fractures in the rock will be made.) Although there may be general knowledge of the fracture closure pressure for the field or even the area of the field where the existing well is located, evaluations using techniques of pumping fluid at increasing rates to achieve fracture initiation followed by shut down to observer fracture closure can be used. These evaluative techniques include step-rate tests, stress tests, and Diagnostic Fracture Injection Testing (DFIT), as well as, other tests known or later developed by the art.

It is noted that there is no requirement to provide or address the theory underlying the novel and groundbreaking production rates, performance or other beneficial features and properties that are the subject of, or associated with, embodiments of the present inventions. Nevertheless, various theories are provided in this specification to further advance the art in this important area, and in particular in the important area of hydrocarbon exploration and production. These theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the conductivities, fractures, drainages, resource production, and function-features of embodiments of the methods, articles, materials, devices and system of the present inventions; and such later developed theories shall not limit the scope of protection afforded the present inventions.

The various embodiments of restimulation operations set forth in this specification may be used for various oil and gas field operations, other mineral and resource recovery fields, as well as other activities and in other fields. Additionally, these embodiments, for example, may be used with: oil and gas field systems, operations or activities that may be developed in the future; and with existing oil and gas field systems, operations or activities which may be modified, in-part, based on the teachings of this specification. Further, the various embodiments set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A method of increasing a total production of hydrocarbons from an existing well in a formation, over a predetermined period of time, the method comprising:
    a. pumping a restimulation fluid into the well at a predetermined flow rate and predetermined pressure, wherein a stasis is achieved that is at or below the closure pressure of the well;
    b. maintaining the well at the stasis for a predetermined period of time;
    c. wherein, existing fractures are opened during the stasis; and,
    d. whereby the total production of hydrocarbons from the well is increased, compared to a first total product for the well prior to restimulation, by at least about 10%;
    e. wherein the stasis is at about 85% to 98% of the closure pressure.

2. A method of increasing a total production of hydrocarbons from an existing well in a formation, over a predetermined period of time, the method comprising:
    a. pumping a restimulation fluid into the well at a predetermined flow rate and predetermined pressure, wherein a stasis is achieved that is at or below the closure pressure of the well;
    b. maintaining the well at the stasis for a predetermined period of time;
    c. wherein, existing fractures are opened during the stasis; and,
    d. whereby the total production of hydrocarbons from the well is increased, compared to a first total product for the well prior to restimulation, by at least about 10%;
    e. wherein the stasis is at about 65% to about 85% of the closure pressure.

3. A method of increasing a total production of hydrocarbons from an existing well in a formation, over a predetermined period of time, the method comprising:
    a. pumping a restimulation fluid into the well at a predetermined flow rate and predetermined pressure, wherein a stasis is achieved that is at or below the closure pressure of the well;
    b. maintaining the well at the stasis for a predetermined period of time;
    c. wherein, existing fractures are opened during the stasis; and,
    d. whereby the total production of hydrocarbons from the well is increased, compared to a first total product for the well prior to restimulation, by at least about 10%;
    e. wherein the stasis is maintained for about 30 minutes to about 3 hours.

4. A method of increasing a total production of hydrocarbons from an existing well in a formation, over a predetermined period of time, the method comprising:
    a. pumping a restimulation fluid into the well at a predetermined flow rate and predetermined pressure, wherein a stasis is achieved that is at or below the closure pressure of the well;
    b. maintaining the well at the stasis for a predetermined period of time;
    c. wherein, existing fractures are opened during the stasis; and,
    d. whereby the total production of hydrocarbons from the well is increased, compared to a first total product for the well prior to restimulation, by at least about 10%;
    e. wherein the stasis is maintained for less than about 3 hours.

5. A method of increasing a total production of hydrocarbons from an existing well in a formation, over a predetermined period of time, the method comprising:
    a. pumping a restimulation fluid into the well at a predetermined flow rate and predetermined pressure, wherein a stasis is achieved that is at or below the closure pressure of the well;
    b. maintaining the well at the stasis for a predetermined period of time;
    c. wherein, existing fractures are opened during the stasis; and,
    d. whereby the total production of hydrocarbons from the well is increased, compared to a first total product for the well prior to restimulation, by at least about 10%;
    e. wherein the stasis is maintained form about 15 minutes to about 2 hours.

6. A method of stimulating a well having existing fractures, wherein the existing fractures comprise induced, naturally occurring or both fractures, and a production rate of hydrocarbons, by repressurization, the method comprising:
    a. pumping a repressurization fluid into the well, thereby establishing and maintaining a stasis that is at or below the closure pressure of the well, wherein the stasis is maintained for a period of time comprising 15 minutes to 2 hours;
    b. wherein at the stasis existing fractures are opened and pore surface are wetted with the repressurization fluid; and,
    c. whereby, the production rate of the well is increased.

* * * * *